Jan. 8, 1952  C. CLEGG  2,582,103
ELECTRIC HEATING OF WASH BOILERS AND THE LIKE
Filed March 6, 1950

Inventor
Carlton Clegg,
By
Attorneys

Patented Jan. 8, 1952

2,582,103

UNITED STATES PATENT OFFICE 2,582,103

ELECTRIC HEATING OF WASH BOILERS AND THE LIKE

Carlton Clegg, Rochdale, England

Application March 6, 1950, Serial No. 147,813
In Great Britain March 9, 1949

4 Claims. (Cl. 219—38)

This invention relates to improvements in or relating to externally heated electric heating of wash boilers and like boilers, tanks, cylinders and other vessels of the type in which a vessel is provided below the boiler or the like, this vessel being exposed to the action of heating means by which water in the vessel is heated for circulation to the boiler.

According to the invention the multi-sided vessel is suspended below the base of the wash boiler at one side thereof with an electric heating element clamped onto the outside of each side of the vessel to heat the water in the vessel which rises into the boiler, the lower end of the vessel being connected by a return pipe spaced therefrom to the opposite side of the boiler through which cooler water passes to the vessel to replace that heated therein.

The invention will be described with reference to the accompanying drawings.

Figure 1:
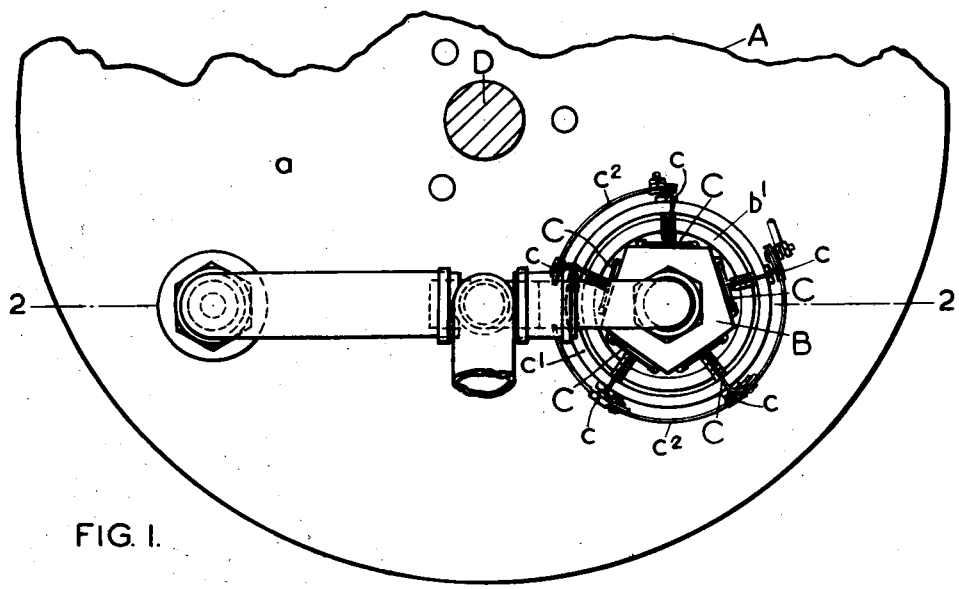
Figure 2:
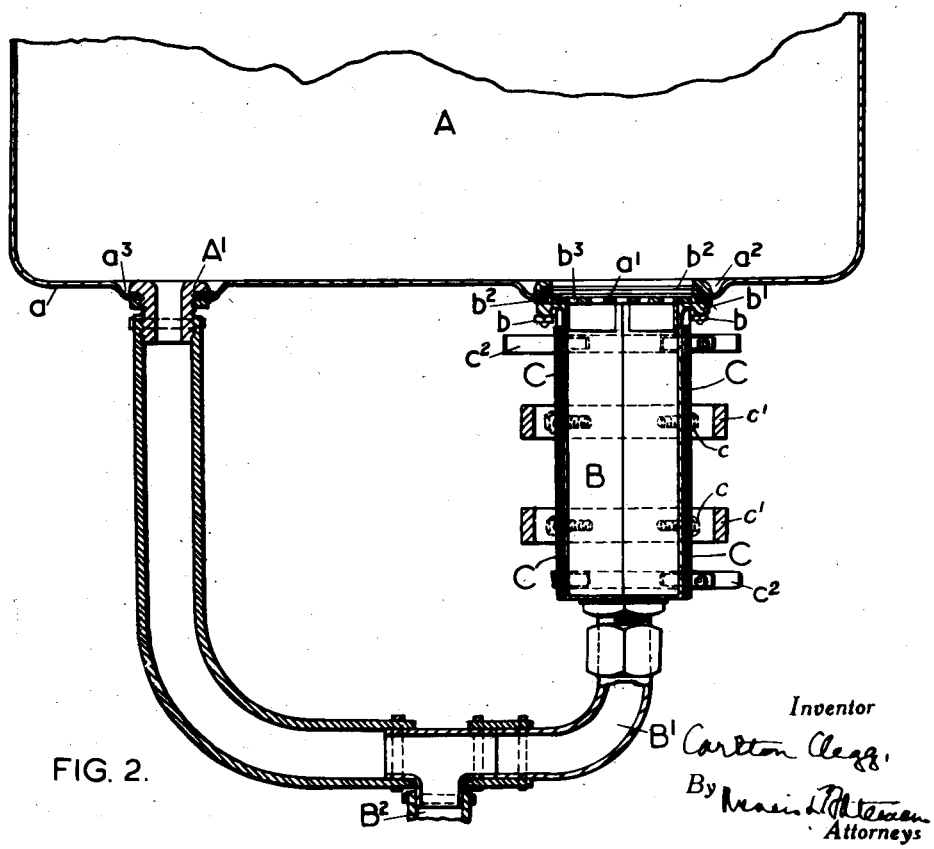

Fig. 1 is a plan of the wash boiler from below;
Fig. 2 is a vertical section on line 2—2, Fig. 1.

The base $a$ of a wash boiler A is recessed adjacent the side or towards the outer end of a diameter with an aperture $a^1$ in the centre of the recess $a^2$. A multi-sided flanged vessel B, five sides have been found to be satisfactory, is secured, preferably by studs $b$ passing through the flange $b^1$ to the underside of the recessed portion of the base $a$, a rubber or other resilient packing $b^2$ preventing leakage between the base and the vessel. A perforated flanged cover $b^3$ is inserted into the recess $a^2$ in the base $a$ to prevent solid matter from passing from the boiler to the vessel B.

An electric heating element or elements C is mounted on each side of the vessel B the elements C being kept in contact therewith by set screws $c$ passing through a ring $c^1$ surrounding the elements C and engaging therewith.

Current is fed to the heating elements through contact strips $c^2$ connected to the source of supply through a switch or switches to enable two or more elements to be simultaneously in circuit.

The lower end of the vessel B is connected by a pipe $B^1$ to the base of the boiler at a point substantially spaced from the aperture $a^1$, a tap or flexible hose $B^2$ being mounted on a junction in the pipe $B^1$ at its lowest point by which the water contents of the boiler A and vessel B may be emptied.

The base $a$ of the boiler is formed with a second recess $a^3$ to receive a flanged nipple $A^1$ adapted to screw onto the end of the pipe $B^1$.

In operation the water in the vessel B is heated by the electric elements C and rises into the boiler A cooled water therefrom passing down the return pipe $B^1$ to the bottom of the vessel A. A continuous circulation through the boiler A and vessel B is thus obtained the advantage of spacing the inlet recess $a^3$ to the pipe $B^1$ as far apart as possible from the outlet from the upper end of the vessel B being to prevent interference by the rising heated water with the cooler water passing to the return pipe $B^1$. Furthermore the recesses $a^2$ $a^3$ in the interior in which the mouth of the vessel and the return pipe $B^1$ are housed enables an agitator D to be mounted in the boiler A without fouling the vessel B.

I claim:

1. An externally heated electric wash boiler having a base provided with apertured recessed portions which are spaced apart laterally and form depressions in the base, a multi-sided upright heating vessel suspended at its upper end from one of the apertured recessed portions of the base of the boiler and having an opening of substantially its full diameter at its upper end communicating with the interior of the boiler, electric heating elements secured against the exterior of the respective sides of the heating vessel to heat water therein and cause discharge of the heated water therefrom through the opening in its upper end into the boiler, and a return pipe connected to the lower end of the heating vessel and to another of said apertured recessed portions in the base of the boiler for the circulation therethrough of cooler water from the boiler to the heating vessel for heating therein.

2. An externally heated electric wash boiler as defined in claim 1, including a perforated cover plate extending over the opening in the upper end of said heating vessel.

3. An externally heated electric wash boiler as defined in claim 1, including a junction member in said return pipe at its lowest point, and a tap connected to said junction member for draining water from the boiler and heating vessel.

4. An externally heated electric wash boiler as defined in claim 1, wherein said heating vessel is polygonal in cross-section, and said electric heating elements are clamped against the respective outer sides of said vessel by rings which surround the heating elements, and set screws passing through said rings and engaging the heating elements.

CARLTON CLEGG.

REFERENCES CITED

The following references are of record in the file of this patent:

UNITED STATES PATENTS

| Number | Name | Date |
|---|---|---|
| 1,617,889 | Woodgate et al. | Feb. 15, 1927 |
| 1,880,255 | Johnson | Oct. 4, 1932 |
| 1,889,747 | Gallagher | Dec. 6, 1932 |
| 2,279,656 | Chamberlin et al. | Apr. 14, 1942 |